United States Patent
Sanka et al.

(10) Patent No.: US 6,609,041 B1
(45) Date of Patent: Aug. 19, 2003

(54) METHOD AND SYSTEM FOR SKU TRACKING AND CHANGEOVER

(75) Inventors: Ravi S. Sanka, Jacksonville, FL (US); Gregory Scott Duncan, Jacksonville, FL (US); Ranganath Ramakrishnan Raja, Jacksonville, FL (US); Gary S. Hall, Jacksonville, FL (US); Daniel Tsu-Fang Wang, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/305,885

(22) Filed: May 5, 1999

(51) Int. Cl.$^7$ .............................................. G06F 19/00
(52) U.S. Cl. ....................... 700/115; 700/116; 700/117; 700/118; 700/163; 425/532; 425/534; 425/541; 425/544; 264/334; 264/337
(58) Field of Search ................................ 700/115, 100, 700/101, 102, 99, 116, 117, 118, 98, 163, 119; 524/566, 567, 570–575, 590; 425/534, 532, 541–545; 428/328, 325, 331; 264/334–337, 296; 24/265 H, 300, 598.5

(56) References Cited

U.S. PATENT DOCUMENTS

| | | | |
|---|---|---|---|
| 4,008,032 A | 2/1977 | Pahl ........................... 425/246 |
| 4,120,629 A | 10/1978 | Christian et al. ........... 425/135 |
| 4,434,652 A | 3/1984 | Christie ....................... 73/146 |
| 4,680,149 A | * 7/1987 | Rawlings et al. ............ 264/2.1 |
| 4,728,784 A | 3/1988 | Stewart ................. 235/462.07 |
| 4,793,262 A | 12/1988 | Horn .......................... 104/168 |
| 4,806,741 A | 2/1989 | Robertson ................... 235/462 |
| 4,921,205 A | 5/1990 | Drew, Jr. et al. ............. 249/61 |
| 4,958,280 A | 9/1990 | Pauly et al. ................. 364/403 |
| 5,206,496 A | 4/1993 | Clement et al. ............. 250/271 |
| 5,208,765 A | 5/1993 | Turnbull ..................... 364/552 |
| 5,246,499 A | 9/1993 | Peralta et al. |
| 5,271,703 A | 12/1993 | Lindqvist et al. ........... 414/268 |
| 5,276,558 A | 1/1994 | Hanson ........................ 360/15 |
| 5,307,261 A | 4/1994 | Maki et al. .................. 364/401 |
| 5,311,424 A | 5/1994 | Mukherjee et al. ......... 364/401 |
| 5,442,562 A | 8/1995 | Hopkins et al. ............. 364/468 |
| 5,456,864 A | * 10/1995 | Wickes et al. ............... 264/2.5 |
| 5,461,570 A | 10/1995 | Wang et al. ................. 364/468 |
| 5,463,555 A | 10/1995 | Ward et al. .................... 700/96 |
| 5,488,223 A | 1/1996 | Austin et al. ................ 235/375 |

(List continued on next page.)

FOREIGN PATENT DOCUMENTS

| | | |
|---|---|---|
| EP | 01 83324 A2 | 6/1986 |
| EP | 06 86491 A2 | 12/1995 |
| EP | 0 686 901 A2 | 12/1995 |
| GB | 1367846 | 6/1972 |

OTHER PUBLICATIONS

International Austrian Search Report for Application No. 200002388–7 dated Aug. 23, 2002.
European Search Report for EPO Appln No. 00303761.1 dated Jul. 1, 2002.

*Primary Examiner*—Ramesh Patel
(74) *Attorney, Agent, or Firm*—Anne B. Kiernan

(57) ABSTRACT

A method for tracking multiple SKUs of ophthalmic devices in a manufacturing line, comprises the steps of: assembling first molding devices, at least one of the first molding devices having an identification device, such as, a bar-code or an inductive transmitting/receiving device; reading the identification device of the first molding devices; forming first molded parts using the first molding devices; providing a plurality of carriers, the carriers having carrier indicators; transferring the first molded parts to at least one of a plurality of carriers; reading the carrier indicator of the carrier carrying the first molded parts; and storing in machine-accessible memory the information associated with the identification device of the first molding devices and the information associated with the carrier indicator of the carrier carrying the first molded parts.

43 Claims, 9 Drawing Sheets

U.S. PATENT DOCUMENTS

| | | | |
|---|---|---|---|
| 5,497,701 A | 3/1996 | Uland | 101/288 |
| 5,500,732 A | 3/1996 | Ebel et al. | 356/124 |
| 5,521,710 A | 5/1996 | Strossman et al. | 358/296 |
| 5,528,878 A | 6/1996 | Edwards et al. | 53/54 |
| 5,555,504 A | 9/1996 | Lepper et al. | 700/115 |
| 5,564,841 A | 10/1996 | Austin et al. | 400/103 |
| 5,565,059 A | 10/1996 | Edwards et al. | 156/517 |
| 5,568,715 A | 10/1996 | Ebel et al. | 53/54 |
| 5,578,331 A | 11/1996 | Martin et al. | 425/445 |
| 5,584,118 A | 12/1996 | Furukawa et al. | 29/701 |
| 5,607,187 A | 3/1997 | Salive et al. | 283/67 |
| 5,607,642 A | 3/1997 | Lepper et al. | 422/62 |
| 5,620,717 A * | 4/1997 | Wickes et al. | 425/175 |
| 5,626,000 A | 5/1997 | Edwards et al. | 53/281 |
| 5,649,410 A | 7/1997 | Martin et al. | 53/474 |
| 5,656,362 A | 8/1997 | Abrams | 428/200 |
| 5,657,066 A | 8/1997 | Adams et al. | 347/198 |
| 5,658,410 A | 8/1997 | Edwards et al. | 156/253 |
| 5,674,347 A | 10/1997 | Edwards et al. | 156/351 |
| 5,675,962 A | 10/1997 | Martin et al. | 53/445 |
| 5,687,541 A | 11/1997 | Martin et al. | 53/54 |
| 5,696,686 A | 12/1997 | Sanka et al. | 364/468.17 |
| 5,706,634 A | 1/1998 | Edwards et al. | 53/473 |
| 5,715,381 A | 2/1998 | Hamilton | 358/1.15 |
| 5,744,357 A | 4/1998 | Wang et al. | 425/347 |
| 5,749,205 A | 5/1998 | Edwards et al. | 53/542 |
| 5,753,150 A * | 5/1998 | Martin et al. | 264/2.5 |
| 5,815,238 A * | 9/1998 | Beaton et al. | 351/177 |
| 5,819,655 A | 10/1998 | Dellivenneri et al. | 101/211 |
| 5,951,934 A * | 9/1999 | Wickes et al. | 264/225 |
| 6,007,229 A * | 12/1999 | Parnell, Sr. et al. | 700/119 |
| 6,024,448 A * | 2/2000 | Wu et al. | 351/160 |
| 6,180,032 B1 * | 1/2001 | Parnell, Sr. et al. | 264/1.1 |

* cited by examiner

| Identification means for Molding Devices | Carrier Indicator | Lot No. | Power | Axis | Cylinder | Discard | Discard Station |
|---|---|---|---|---|---|---|---|
| 017 | 047 | 17235 | -1 | ---- | ---- | N | ---- |
| 017 | 102 | 17235 | -1 | ---- | ---- | N | ---- |
| 017 | 033 | 17235 | -1 | ---- | ---- | N | ---- |
| 017 | 007 | 17235 | -1 | ---- | ---- | N | ---- |
| 055 | 081 | 17236 | -2 | ---- | ---- | N | ---- |
| 055 | 063 | 17236 | -2 | ---- | ---- | N | ---- |
|  |  |  |  |  |  |  | ---- |
|  |  |  |  |  |  |  | ---- |
|  |  |  |  |  |  |  | ---- |

| Carrier Indicator | Location |
|---|---|
| 047 | 1 |
| 102 | 2 |
| 033 | 3 |
| 007 | 4 |
| 081 | 5 |
| 063 | 6 |
|  | 7 |
|  | 8 |
|  | 9 |

| Insert Identification Number 801 | Manu-factured 802 | Qualified 803 | Cassette 804 | Power 805 | Cylinder 806 | Axis 807 | Used for Molding 808 | Needs Repair 809 |
|---|---|---|---|---|---|---|---|---|
| 00435 | Y | Y | 0047 | +1 | ---- | ---- | 11735 | Y |
| 00436 | Y | N | ---- | ---- | ---- | ---- | 0 | ---- |
| 00437 | Y | Y | 0023 | -2 | ---- | ---- | 00049 | N |
| 00438 | Y | N | ---- | ---- | ---- | ---- | 0 | ---- |
| | | | | | | | | |
| | | | | | | | | |
| | | | | | | | | |
| | | | | | | | | |

FIG. 8

METHOD AND SYSTEM FOR SKU TRACKING AND CHANGEOVER

FIELD OF THE INVENTION

This invention relates generally to a contact lens manufacturing facility for producing ophthalmic devices, and, in particular, to a SKU tracking and changeover method and apparatus for fabricating and packaging multiple stock keeping units (SKUs) of ophthalmic devices in a single manufacturing line.

DESCRIPTION OF THE PRIOR ART

The direct molding of hydrogel contact lenses is disclosed in U.S. Pat. No. 4,495,313 to Larsen, U.S. Pat. No. 4,680,336 to Larsen et al., U.S. Pat. No. 4,565,348 to Larsen, and U.S. Pat. No. 4,640,489 to Larsen et al., the entire disclosures of which are hereby incorporated by reference in this patent application. Essentially, these references disclose an automated contact lens production process wherein each lens is formed by sandwiching a reaction mixture between back curve (upper) and front curve (lower) lens curve assembly. The reaction mixture is polymerized, thus forming a lens, which is then removed from the front and back curves and further treated and packaged for consumer use.

The reaction mixture is sandwiched at a reaction mixture filling and lens curve assembly station wherein the polymerizable reaction mixture is first deposited into the front curve and the back curve is subsequently placed on top of the front curve to form a lens curve assembly. A carrier or pallet further transports the contact lens curve assemblies to other stations in the manufacturing line for further processing, until a completed polymerized contact lens is produced. The contact lens is then contained in a primary package along with a buffered solution. Typically multiple primary packages are housed in a carton, each carton having one or more labels which identify its contents.

One production line tracking and quality control system is disclosed in U.S. Pat. No. 5,555,504 to Lepper et al. That system provides bar codes on the lens carrying pallets which allow a control system to distinguish good and flawed lenses in the production line. That system, however, is not well suited for simultaneously handling multiple SKUs in a single production run in a single manufacturing line.

What is needed in the art and heretofore has not been available is a tracking and control system which ensures that separate SKUs can be simultaneously fabricated, packaged, and suitably labeled in a single production run in a single manufacturing line. The present invention satisfies this and other needs.

SUMMARY OF THE INVENTION

This invention provides a method for tracking multiple SKUs of ophthalmic devices in a manufacturing line, comprising the steps of:
  assembling first molding devices at least one of said first molding devices having an identification means;
  reading said identification means of said at least one of said first molding devices;
  forming first molded parts using said first molding devices;
  providing a plurality of carriers, said carriers having carrier indicators;
  transferring said first molded parts to at least one of said plurality of carriers;
  reading said carrier indicator of at least one of said plurality of carriers carrying said first molded parts; and
  storing in machine-accessible memory the information associated with said identification means of said at least one of said first molding devices and the information associated with said carrier indicator carrying said first molded parts.

This invention further an system for tracking multiple SKUs of ophthalmic devices in a manufacturing line, the system comprising:
  machine-accessible memory;
  first molding devices at least one of said first molding devices comprising an identification means;
  wherein said first molding devices make first molded parts;
  means for reading said identification means of said at least one of said first molding devices;
  a plurality of carriers, said carriers having carrier indicators;
  means for transferring said first molded parts to at least one of said plurality of carriers;
  means for reading said carrier indicator of said at least one of said plurality of carriers carrying said first molded parts; and
  means for storing in said machine-accessible memory the information associated with said identification means of said at least one of said first molding devices and the information associated with said carrier indicator carrying said first molded parts.

This invention provides a method and apparatus for tracking molded parts in a manufacturing line. This invention makes it possible to use a single manufacturing line to make multiple stock keeping units (SKUs) in a single production run, that is, without having to shut down the line, or clear one SKU from the line before the production of a different SKU begins. There can be multiple SKUs at various locations in the manufacturing line simultaneously. This is particularly beneficial for making ophthalmic devices, in particular, contact lenses having various designs and powers, and lens curves which are used to form the contact lenses.

This invention further provides an automated method of tracking molding devices comprising putting an identification means on molding devices, and providing a database comprising fields for the status of said molding devices.

This invention further provides an automated method of scheduling the production of ophthalmic devices using molding devices for use in at least one manufacturing line which is capable of making multiple SKUs comprising:
  a). communicating to a scheduling program demand for different ophthalmic devices;
  b). communicating to said scheduling program the status of molding devices;
  c). scheduling by said scheduling program based on the information communicated to said scheduling program in steps a and b which of said molding devices are to be used in said at least one manufacturing line.

This invention provides a method of scheduling the production of ophthalmic devices, preferably contact lenses, which consists of many stock keeping units (SKUs) which can be made in at least one manufacturing line. The molding devices, e.g., molds, mold halves, inserts and/or the cassettes can be interchanged among and within the one or more manufacturing lines to form the various SKUs. Preferably there are multiple manufacturing lines which share the molding devices, e.g., molds, mold halves, inserts and/or the cassettes, and a single scheduling program schedules the production of the different SKUs for the multiple manufacturing lines. This invention makes it possible to have fewer, inserts, cassettes, mold halves and/or molds for forming all the SKUs, than if each manufacturing line had a complete set of inserts, cassettes, mold halves and/or molds to make all the SKUs. Preferably the number of molding devices will be more than the number of manufacturing lines in which they are used, but preferably the number of molding devices will be limited so that not all of the manufacturing lines can make all of the same SKUs simultaneously. Further, this invention makes it possible to automatically schedule production based on product demand determined from historical data and/or actual orders, and the availability of molding devices to efficiently use the one or more manufacturing lines. This invention is particularly beneficial for making ophthalmic devices, in particular, contact lenses having various designs and powers.

BRIEF DESCRIPTION OF THE DRAWINGS

In the drawings, wherein like reference numerals delineate similar elements throughout the several views:

FIG. 6 is a database useful in this invention.

FIG. 7 is a database useful in this invention.

FIG. 8 is a database useful in this invention.

DESCRIPTION OF THE PREFERRED EMBODIMENT

Figure 1:
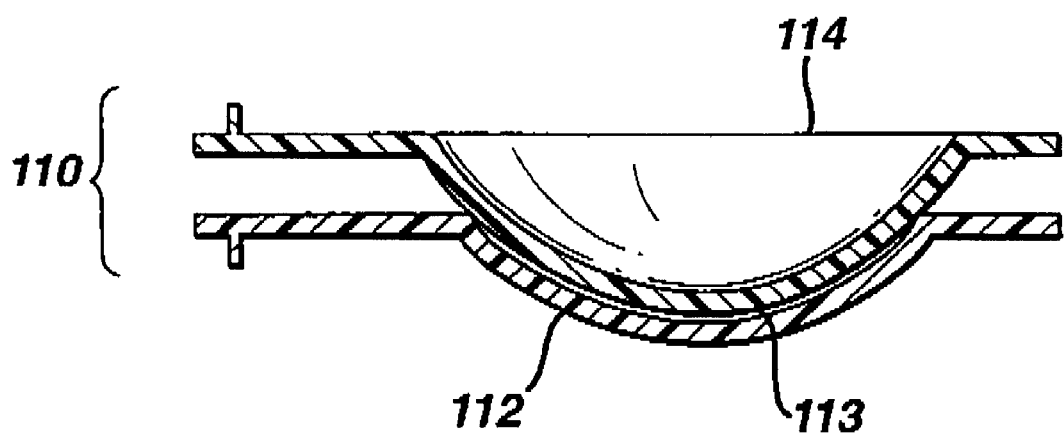
FIG. 1 is a side elevational view of a front curve and back curve assembly, which includes a front curve, and back curve.

By way of overview and introduction, it is highly desirable in the art of contact lens fabrication to manufacture a great variety of lenses (that is, various combinations of power and surface curvatures) to satisfy the needs of consumers. Yet there may not be a need for a great number of any given lens configuration. Conventionally, a fabrication and packaging facility has been configured to produce one SKU of lenses at a time, each lens having the same predetermined optical characteristic, for example, all the lenses are +1 spherical power. As a result, a limited number of stocking units (SKUs) are produced in large SKU sizes. Changing production to a different SKU has required cleaning out the manufacturing line, and changing the molds. Changing the molds, or inserts in the molds, that are used in such systems has been attendant with machine downtime. The present invention addresses the need for greater numbers of SKUs in smaller SKUs by fabricating multiple, different SKUs without requiring that the manufacturing line be shut down and cleaned out, and the invention avoids cross-contamination of the different SKUs. In particular, the method and apparatus of the present invention are uniquely adapted to track the carrier of molded parts as it passes through the manufacturing line or fabrication facility, and also to differentiate the molded parts being supported on the carriers. This further tracking (differentiation) avoids cross-contamination, an issue which does not arise in conventional production runs, because such runs are configured to produce only one SKU at a time. The tracking in accordance with the invention also ensures that the contact lenses are properly packaged, provided with suitable labels, and placed in suitable cartons.

As used herein, the term "cross-contamination" refers to the mixing up of one or more molding devices, e.g., the incorrect use of one or both of the first and second mold halves, one or multiple inserts and/or cassettes of one SKU with the first or second mold halves, one or multiple inserts and/or cassettes of another SKU, or the mixing of one or both of the front and back lens curves used to form one SKU with one or both of the front or back lens curves used to form another SKU such that the resulting lens does not have the optical characteristics that were intended. The term "cross-contamination" also refers to the inadvertent mislabeling of a package or carton containing one or more packages housing a different SKU. Cross-contamination also includes when one contact lens from one SKU gets mixed into another SKU, for example when there is a problem, e.g. a jam, in the manufacturing line and lenses get moved from one carrier to another carrier. Cross-contamination also refers to the mistaken belief that a specified lens is being made. The manner in which cross-contamination may occur and the method and the apparatus of the present invention which avoid cross-contamination of SKUs are described in detail below.

The term "molding device" means mold, mold half, cassette, and/or insert or the like.

A "mold" is used to make a molded part. A mold typically comprises two "mold halves". A mold can be used in an injection molding machine, other molding machine or molding tool. One mold half can be stationary, and the other movable. Each mold has one or more "inserts" which define an opening for receiving the reactive mixture or molten material for forming a molded part, therein. The insert can be contiguous with the mold or mold half, or removable from it.

A "cassette" is a device which comprises more than one insert which fits into or is mounted onto a mold or mold half and is removable from the mold or mold half. The cassettes are preferably quickly and simply removable and replaceable from the mold half. Cassettes are further described in concurrently filed Parnell et al, "Mold and Molding Machine for Making Ophthalmic Devices", U.S. Ser. No. 09/305,886, (VTN-424) incorporated herein by reference.

The "identification means" is a number, bar-code, two dimensional matrix, three dimensional matrix, inductive transmitting/receiving device, or radio frequency chip, or the like. Preferably each identification means contains some unique information for every part having one. "Carrier indicators" and "tray identifiers" are types of identification means, they can all be different, the same, or a mix of types.

The "carrier" is a device which holds one or several molded parts and/or ophthalmic devices. Carriers can take any form, they can be pallets as disclosed in the prior art, e.g., U.S. Pat. No. 5,555,504, they can be packages, or any type of support, which can be used for holding and conveying the molded parts and/or ophthalmic devices. "Trays" and "holders" are types of carriers, they can all be different, the same, or a mix of types.

"Lens curves" are parts used for molding contact lenses. Typically lens curves are made by injection molding and are disposable. Lens curves are preferably "front curves" and "back curves" which when assembled form a "lens curve assembly" within which a contact lens is formed. The front curve forms the front surface of a contact lens. The back curve forms the back surface of a contact lens. The term "mold halves" will not be used herein to refer to disposable lens curves.

The term "stock keeping units" ("SKUs") refers to different devices, e.g., different products. For example, contact lenses having different powers, and/or cylinders and/or axis values, each combination of power(s), cylinder and axis represents a different SKU, each SKU being manufactured using different molds or a different orientation of the molds, or different reactive mixtures within the molds.

The method of this invention is used to track multiple SKUs of ophthalmic devices which are either molded parts and/or are made using molded parts. The ophthalmic devices can be for example, contact lenses, spectacle lenses, or intraocular lenses; however, the ophthalmic devices are preferably contact lenses. This invention will be described for contact lenses; however, it is understood that other ophthalmic devices can be made by the method of this invention.

The optical characteristics of a contact lens is partly determined by the shape and thickness of the lens, and these features are determined by the selection of a specifically shaped molding device or devices, typically the inserts, in which the contact lens reactive mixture is polymerized or crosslinked, or in which thermoplastic is shaped to make lens curves, and then the contact lens reactive mixture is polymerized or crosslinked in the lens curves. The molding devices can be a mold, two mold halves, cassettes or inserts. Preferably the mold comprises two mold halves, and each mold half comprises one or a plurality of complementary inserts. When the mold is closed, the inserts define cavities in which preferably multiple molded parts are formed. More preferably, the molding device used to make the ophthalmic devices comprises two mold halves, at least one mold half comprising at least one, preferably a plurality of cassettes, each cassette preferably comprising at least two inserts.

Figure 3:
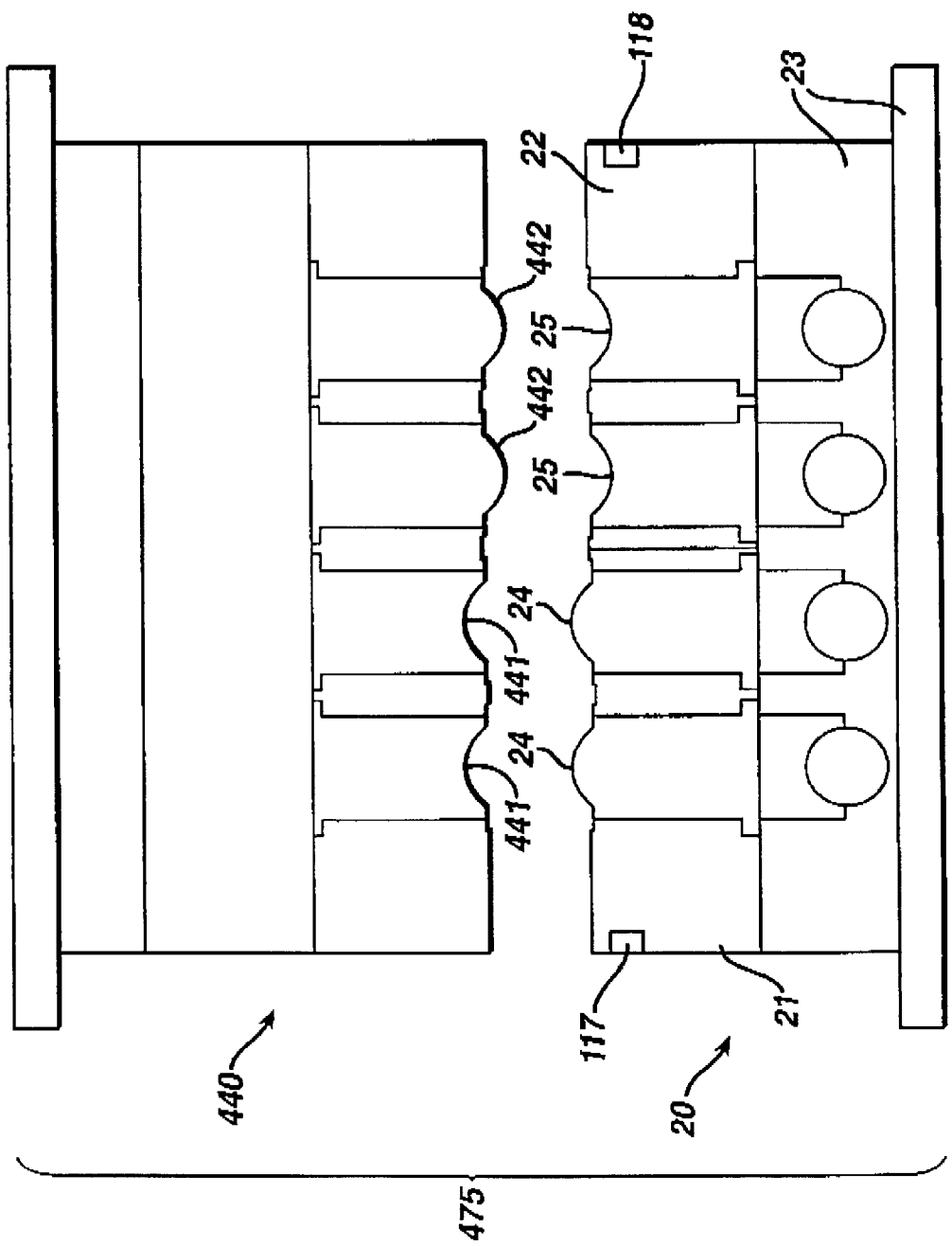
FIG. 3 is a cross-sectional view of a mold shown in the open position; the mold consists of the same first mold half shown in FIG. 1 and a second mold half.

As shown in FIG. 3, the molds preferably comprise two mold halves, a first mold half 20 and a second mold half 440. Either one or both of the mold halves may be changed to produce different molded parts, or the orientation of the mold halves 20, 440 or the inserts 24, 25, 441, 442 within the mold halves may be changed to produce different molded parts, i.e. different SKUs. The molded parts are preferably contact lenses, or lens curves, which are used to mold contact lenses. As required by the process of this invention, at least one molding device has an identification means. If the mold halves are going to be interchanged to produce different ophthalmic devices then each mold half should have at least one identification means. If the mold halves comprise one or more changeable cassettes, then each cassette should have an identification means. If it is desirable to interchange individual inserts between the mold halves, or use inserts alone to form individual molded parts, then each insert should have identification means. It is preferred that the plurality of inserts in each mold half and/or in each cassette is all the same so that one identification means on the mold half and/or on the cassette indicates a single type of insert in the mold half and/or the cassette, although it is possible using this invention to track different inserts and their location in the mold half and/or cassettes.

The molding devices can be used to mold contact lenses directly, for example, in the method described in U.S. Pat. No. 5,782,460 issued Jul. 21, 1998, incorporated herein by reference. If so, then preferably both mold halves of the mold (molding tool) have identification means or all the inserts in both mold halves used to form the contact lens have identification means, because the inserts in both halves of the mold will form optically critical surfaces of a contact lens. In the preferred mode, the plurality of inserts in each mold half are all the same so that one identification means on the mold half indicates the single type of insert in the mold half. In one preferred embodiment, the inserts in one mold half will define the spherical power on one surface of the contact lens and the inserts in the other mold half will define the cylinder power and axis or multifocal powers on the other surface of the contact lens. For other embodiments, that is, for contact lenses for which one surface of the contact lens does not change for a limited number of SKUs, for example, for contact lenses having only a spherical distance power, only one mold half has to be changed to make a contact lens having a different spherical distance power, and therefore only the changeable mold half, cassette or insert for those SKUs need an identification means indicating the contact lenses to be formed in the mold. Presently, it is preferred that both mold halves cassettes and/or inserts have identification means if the mold halves cassettes and/or inserts are used directly to make contact lenses. In the preferred embodiment, the mold halves each comprise changeable cassettes which can be put into and taken out of mold halves, e.g., a molding tool, very simply and quickly. The cassettes will be described in more detail below for the embodiment of this invention which makes lens curves, and uses lens curves to form the contact lenses; however, the cassettes can be used in mold halves, e.g., in a molding tool, for directly forming contact lenses. If cassettes are used in the mold halves, e.g., in the molding tool, then each cassette preferably has an identification means.

Figure 5:
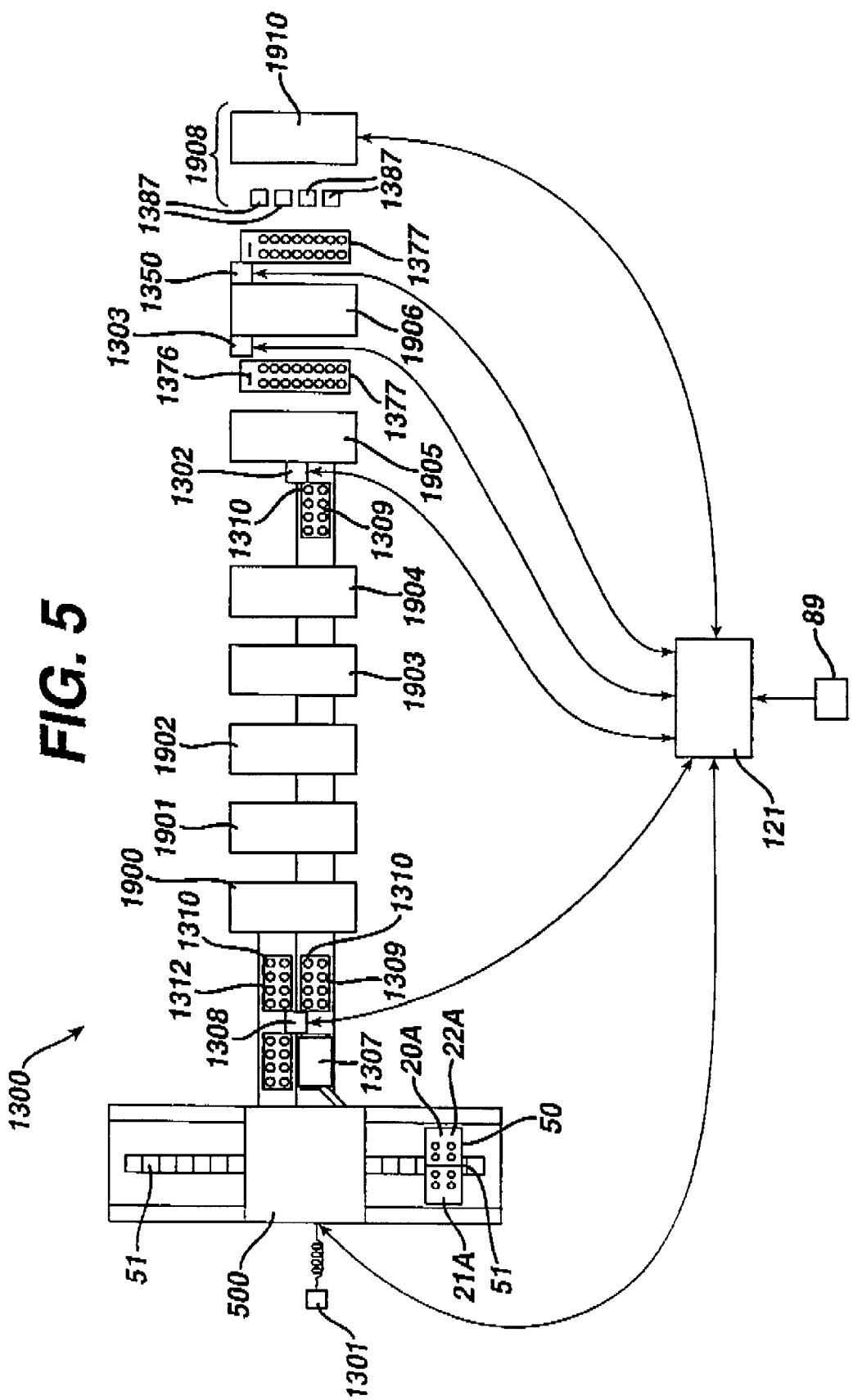
FIG. 5 is a top plan view of a manufacturing line or system of this invention.

In the preferred process of this invention, the mold is used to make lens curves which are later used to make contact lenses. The lens curves, preferably front curves and back curves can be made in one or more molds, preferably in one or more injection molding machines 500 as shown in FIG. 5. FIG. 1 shows a front curve 112 and a back curve 114 used to form a lens assembly 110 that defines a cavity 113 where a contact lens is formed. It is only required that one half of the mold making the front curves and one half of the mold making the back curves have an identification means, because only one surface of the front curves and back curves is optically critical, meaning that only one surface of the front curves and back curves effects the optical properties of the contact lenses made by the front curves and back curves. In the preferred embodiment, the front curves and back curves are made together in a single mold. Each half of this mold can have identification means; however, in the preferred mode, the optically critical sides of the front and back curves are made by the same mold half; therefore, only the mold half which forms the optically critical sides of the front and back curves will have at least one identification means.

Figure 2:
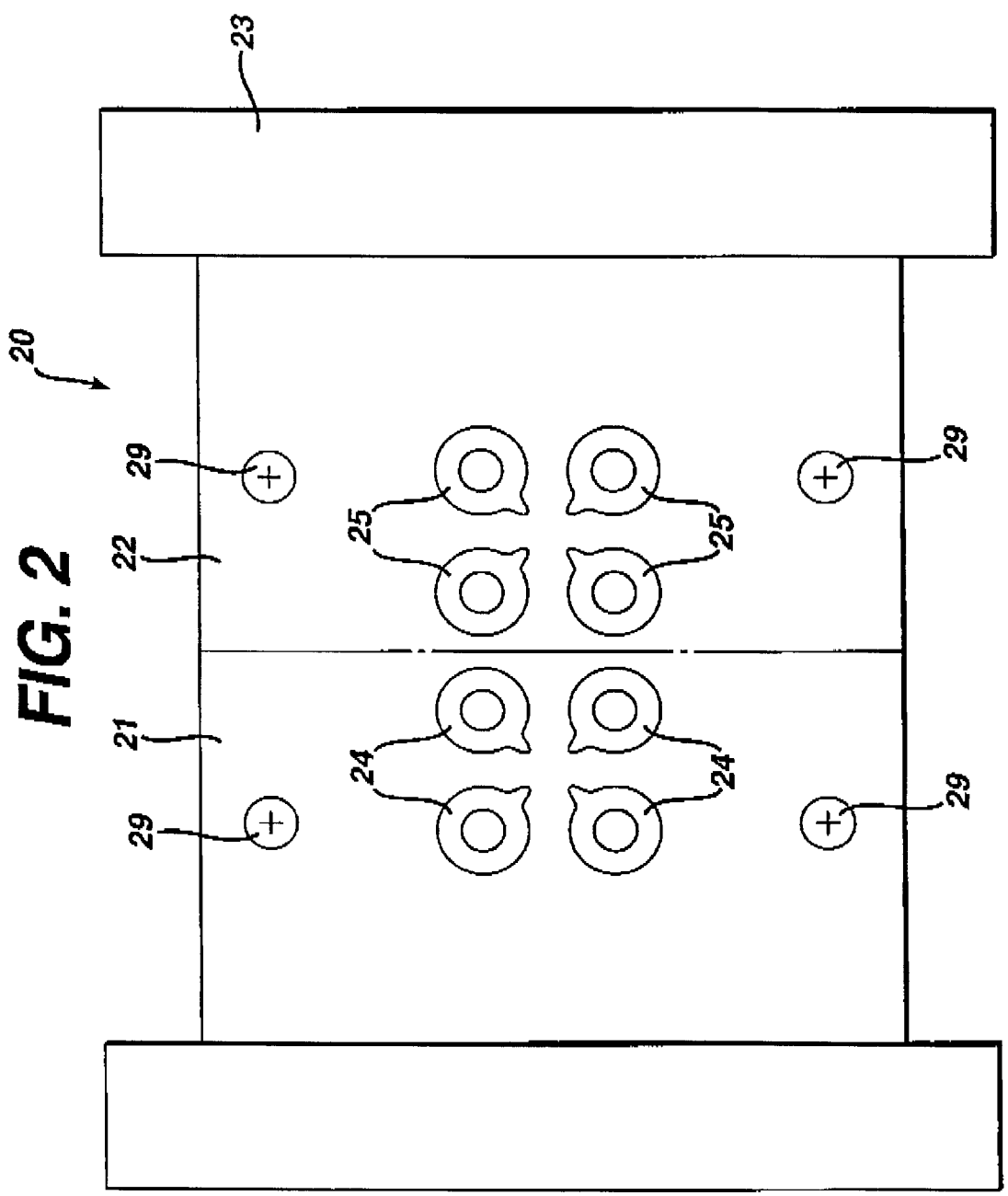
FIG. 2 is a top plan view of a first mold half.

The preferred molds used for forming the contact lenses of this invention are described in concurrently filed Parnell et al, "Mold and Molding Machine for Making Ophthalmic Devices", U.S. Ser. No. 09/305,886, (VTN-424) earlier incorporated herein by reference. The preferred molds can be used directly to make the contact lenses; however, they are preferably used to make lens curves, preferably front curves 113 and back curves 114 which are then used to make the contact lenses. The preferred molds comprise two mold halves, and at least one mold half comprises at least one changeable cassette. The preferred mold 475 is shown in FIG. 3 comprising first mold half 20 and second mold half 440. Preferably, only one mold half comprises at least one changeable cassette, preferably first mold half, 20, the top view of which is shown in FIG. 2. The mold half that has at least one changeable cassette preferably forms the optically critical sides of the front curves and back curves, and preferably, that mold half comprises two changeable cassettes: one cassette preferably has the inserts 24 for forming the front curves 113, and the other cassette has the inserts 25 for forming the back curves 114. Preferably, each cassette comprises a plurality of inserts 24,25, e.g., from two to ten inserts, more preferably four inserts. The cassettes 21,22 are mounted on base 23 of first mold half 20 via screws 29. Preferably, each cassette 21,22 has an identification means 117,118 as shown in FIG. 3, which preferably is read by or inputted into the compute 121 for the manufacturing line shown in FIG. 5. The identification means 117,118 on each cassette can be used to indicate the characteristics of the lens which is made by the inserts 24,25 in that cassette, e.g., the identification means 117 on the cassette 21 containing the front curve inserts 24 will preferably indicate, by information written to and stored in the identification means 117, the spherical power of the front curves (and eventually the lenses) made using that cassette, and the identification means on the cassette 22 containing the back curves 25 will preferably indicate by information written to and stored in the identification means 118, the cylinder and axis of the back curves (and eventually the lenses) made using that cassette. Alternatively, after inputting or reading the identification means 117,118, the computer 121 can access a database, referred to herein as a "molding database" which indicates what front and back curves will be made using the cassettes with those identification means, and/or what SKU will be made by the combination of the front and back curves.

Additional information in the molding database or stored in the identification means may include the process conditions for making the molded part and may automatically cause the equipment to adjust to the process conditions for the molded parts made by the mold.

Each cassette or mold preferably includes a unique identification means, preferably a machine-readable identification means, which may take the form of a uniquely assigned number, bar-code, or code on a radio frequency (RF) chip. RF chips are presently preferred, and a suitable RF chip for use with the cassettes is available from Pepperl+Fuchs, Inc. of Twinsburg, Ohio, under model number Inductive Data Carrier indicator C-12-1 K. The IDC-12-1 K is an EEPROM and includes 1024 bits of addressable memory. The RF chip is preferred, because it is capable of storing a unique identification number and information about the part to be molded, e.g., the front or back curves to be molded by the inserts in the cassettes. The identification means, if it is an RF chip, is machine-read from the cassette or mold under the direction of the computer using, e.g., a Pepperl+Fuchs, Inc. inductive read/write head such as model number IVH-I 8GM-V 1. A suitable bar code reader is the Scanstar Model I 10 manufactured by Scanstar, Inc. of Atlanta, Ga. Other examples and alternatives, including vision systems, would be known to a person of one skilled in the art. A further alternative is that the identification means, although less preferred, is a number or the like which can be inputted into the computer by an operator.

Before the mold is used to make a molded part, the one or more identification means preferably on the first mold half, and/or second mold half, and/or on the cassettes in either the first mold half and/or the second mold half is read either by an Operator or by a machine-reader, preferably by a machine-reader, and inputted into the computer for the manufacturing line. FIG. 5 shows a machine-reader 1301 that an operator can move into place when a mold is changed to read the identification means 117 and 118 on the cassettes, 21 and 22. As stated earlier, either the identification means is used to access the "molding database" which contains information about the molded part to be made using the mold, or information about the molded parts to be made using the mold is inputted into the computer 121 from the identification means when the identification means is read. Such information preferably includes at a minimum the optical characteristics, e.g., power, cylinder, axis of the contact lenses which are made either directly or indirectly by using the mold. Additional information may include lot number, and/or process conditions, e.g., curing time, dosing amount, cooling times, and temperatures for the mold. At present, the preferred information is the optical characteristics, and product line, e.g Acuvue®, Surevue®, of the contact lens.

In the preferred embodiment, the identification means 117,118 of the cassettes 21,22 are read and preferably checked either by an operator, or by the manufacturing line computer 121 to be sure they are correct for the SKU to be made, and if correct, the cassettes are mounted into the injection molding machine 500 or molding tool. (Alternatively, the identification means can be checked after mounting.) The information associated with the identification means is preferably stored in machine-accessible memory in the computer 121. The inserts in the mold are dosed with material to form the molded parts. The molded parts may undergo a photo-curing and/or cooling step before the molded parts are removed from the mold and placed in a carrier 1309. Removal and placement of the molded parts can be done by one or more robots 1307. The molded parts may have to undergo further processing, e.g., if they are lens curves, or the molded parts may be ready for packaging, e.g., if the molded parts are contact lenses. The carrier can carry one or a number of molded parts, preferably between 1 and 12 parts. The carriers can be part of the final package for the contact lens, or the carrier may be as shown in FIG. 13, a pallet 1309 into which the molded parts fit or rest in or on. Alternatively, the carriers may carry part of the final package into which a molded part is placed. The only requirement is that the carrier has a carrier indicator 1310 similar to the identification means 117,118 which either stores all the information in machine-accessible memory in the carrier indicator about the molded parts it carries, or to which after the carrier indicator is read or inputted into the computer 121, information about the molded parts which was associated with the one or more identification means 117,118 of the mold (cassette) is associated in machine-accessible memory in the computer 121 to the carrier indicator 1310. The latter is preferred. This can be accomplished by providing a database shown in FIG. 6 which will be referred to as the "production database" 1400 preferably in the computer 121 for the manufacturing line 1300 which keeps track of the molded parts and/or ophthalmic devices in the manufacturing line 1300. The production database 1400 has fields for storing information about the parts some of which are shown in FIG. 6, for example, the identification means of the molding devices 1401, the carrier indicator 1402, the SKU information, e.g, the lot number 1403, power 1404, or powers (if multifocal lenses), axis 1405, cylinder 1406, the number of parts of the SKU made, the orientation of the inserts, if applicable, the process conditions (e.g., time stamps), whether the part was discarded 1407, the reason for the discard, and/or station 1408 where discard status was assigned, location in the carrier, inspection failures, etc.

Preferably, a carrier will carry only one SKU of molded parts. If there are not enough of the same SKU of molded parts, then the carrier will remain partially empty. Preferably, after the carrier indicator 1310 is read by the computer, the information which had been read/inputted into the computer from the identification means of the mold (cassette) is then moved or copied to the production database 1400 of which one of the available records is preferably the carrier indicator 1402. Preferably there is a second database called a "location database" 700 shown in FIG. 7 which has a record for the carrier indicator 701 and/or a database pointer to the carrier indicator in the production database and a record for the location 702 of the carrier in the manufacturing line. Every time a new carrier moves into the station to receive molded parts and the new carrier indicator is read and entered into the production database 1400, the location of all the other carriers in the manufacturing line are pushed ahead by one location in the location database 700 and the new carrier information is added to the location database 700. The location database 700 is used to logically track the carriers 1309. Carrier indicator readers e.g. 1302, 1303, 1350 located at various stations in the manufacturing line 1300 can be used to physically check if the carriers 1309 are in the same location as the location database 700 indicates. If there is a disconnect between the location database 700 and actual carriers 1309, any incorrect carriers or all the carriers can be marked for discard. If preferred, the molding database (not shown), location database 700 and/or production database 1400 can be combined into one database or split into additional databases which serve the purposes described.

If the molded parts are contact lenses, each carrier will preferably have one or multiple parts of the final packages on it, e.g., a bowl as described in the prior art, into which the contact lenses will be individually placed. The carrier will then transport the package(s) to an area of the manufacturing line for further processing, preferably to an area where a package cover, e.g., lidstock, is added and preferably heat-sealed to the package. Preferably, information identifying the contact lens is printed onto the cover or lidstock prior to its application to the package. The printing can be by any technique, including laser etching, embossing, and thermal transfer printing, preferably laser etching. The information is provided to the printer from the computer controlling the manufacturing line. Preferably, the carrier indicator is inputted into or read by the computer as the carrier approaches the stations in which the lidstock is printed and/or applied to the package, and the stored information in the production database, e.g., power, cylinder and axis, and lot number, associated with the carrier indicator, is communicated to the printer, and used by the printer to print identifying information on the lidstock. Alternatively, such information can be provided to the printer from the information stored in the carrier indicator. Alternatively, the information could be provided by the location database. Preferably after the carrier indicator is read, the location database is checked to make sure that the correct carrier is at the proper station. Additional processing steps, which may occur before or after adding the cover, include inspection, sterilization, or the addition of secondary packaging, e.g., placement of multiple packages in cartons. Preferably, the printer adds machine-readable information onto the cover or carton, e.g., a bar code, which aids the identification and tracking of the contact lenses in the packages after they are removed from the carriers having carrier indicators.

In the preferred mode, the mold is used to make lens curves in an, injection molding machine 500. Preferably, the mold 475 comprises one cassette 21 for making front curves 112 and one cassette 22 for making back curves 114, both in one mold half 20. In the most preferred mode, a mold half is changed, or a cassette within a mold half is changed, using the quick-change cassette mechanism described in "Mold and Molding Machine for Making Ophthalmic Devices", U.S. Ser. No. 09/305,886 earlier incorporated by reference. A change in the mold half will cause different back curves and/or front curves to be created by the injection molding machine, and the resulting contact lenses will be of a different SKU. Preferably the cassettes are assembled in a mold half in a mold half staging area 50 for the next mold half 20A to be used in the injection molding machine 500. The staging area may be in a transport mechanism 51 (two transport mechanisms are shown) for the mold half for moving it into and out of position to work in conjunction with another mold half 440 (not visible) in the injection molding machine 500 to make molded parts. Before the mold half 20A is inserted into the injection molding machine from the staging area 50, the identification means 117,118 of the two cassettes 21A,22A (the-second molding devices) are machine-read by reader 1301 and checked to be sure the correct cassettes are in the mold half 20A comprising the cassettes. Preferably the identification means 117,118 are only read when a mold half 20A is in the staging area at the time a mold half change is planned. If the cassettes 21A,22A in the mold half 20A are correct, the information read from the identification means of the next mold half 20A (the second mold half) to be loaded into the injection molding machine, e.g., spherical power, cylinder and axis is stored in a location for the present mold information in the machine-accessible memory in the computer 121. In the preferred mode, a scheduling program 89 which will be described in more detail below, assigns the cassettes to be used in the manufacturing line, assigns a lot no. and a UPC code to the SKU to be produced, and specifies the number of the SKU to be made and communicates this information to the manufacturing line. Preferably, in the above-mentioned checking step, the information from the scheduling program 89 communicated to the computer 121 for the manufacturing line 500 about the scheduled cassettes is checked. If the correct mold half 20A (cassettes in the mold half) according to the scheduling program 89 was assembled and ready for loading into the injection molding machine 500, when the injection molding machine is ready, e.g., the injection molding machine completes the first SKU, the first molding device (first mold half with cassettes) is removed, the second molding device (the second mold half 20A with cassettes 21A,22A) is mounted into the machine, and the injection molding machine begins making the second molded parts, i.e., front curves and back curves using the second mold half. If desired, the system 1300 can cause an empty carrier to be conveyed through the manufacturing line whenever there is a change in the mold half to provide a visual indication of the end of one SKU (and the beginning of another). If a mold change is not required, it may still be desired that an empty pallet be inserted between SKUs. (A mold change may not be required for all SKU changes: e.g., the rotation of inserts in the mold if contact lenses are made directly or a lens curve rotation in the reaction mixture deposition chamber can be used to create a different SKU).

Figure 4:
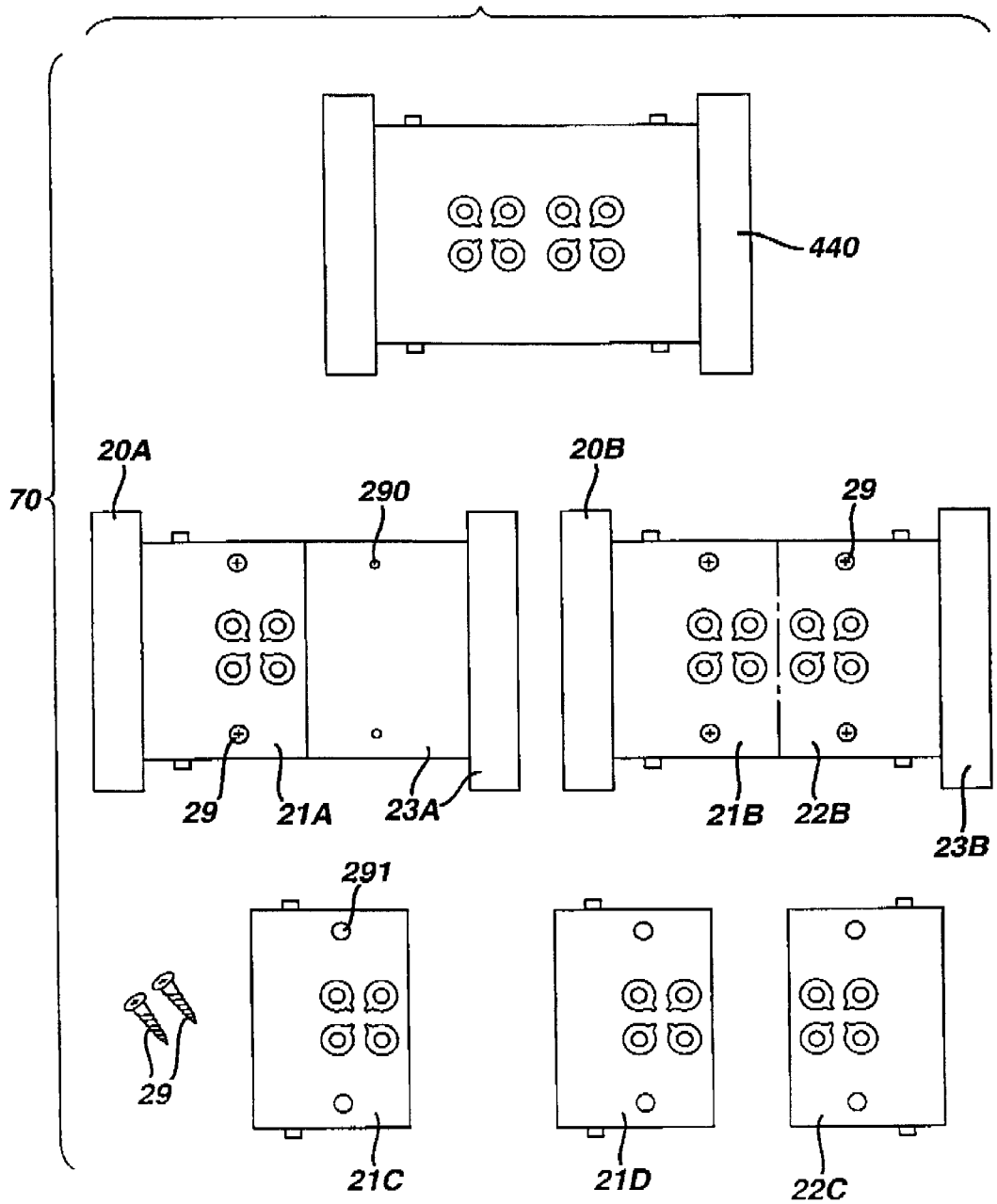
FIG. 4 is a top plan view of each of the interchangeable components of a molding system.

FIG. 4 shows a system 70 in which first mold halves 20A and 20B can be used separately with second mold half 440 and cassettes 21A, 21B, 21C, 21D can be interchanged and paired with 22B and 22C as desired. Screws 29 are used to mount the cassettes on bases 23A and 23B. The screws go through holes 291 and 290 of the cassettes and bases, respectively.

After each mold cycle the front curves are removed from the mold and placed on a carrier 1309, preferably a pallet, which has a carrier indicator. The back curves which are preferably simultaneously formed in the same mold as the front curves are moved to a carrier 1312, preferably a different carrier, e.g., a pallet which may or may not have a carrier indicator. At present it takes two molding cycles to fill one carrier with front curves and one carrier with back curves. If a carrier has already been partially filled with lens curves corresponding to a different SKU,e.g., only four of eight cavities in a pallet, the half-filled carrier will be conveyed to the next processing station and an empty carrier will then receive the lens curves corresponding to the new SKU. The one or more carrier indicators 1310 are machine-read via 1308 or otherwise inputed into the computer 121 for the manufacturing line 1300, and the information about the front curves and back curves from the identification means which was stored in a location for the present mold information in the computer is copied or moved to the production database 1400 and stored with the one or more carrier indicators 1310. Preferably the carrier indicator 1310 of the pallet holding the front curie molds and not the back curve molds is stored in the production database 1400 in record 1402 but the pallet 1312 carrying the back curves is related to, or advances with, the pallet 1309 carrying the front curves in the manufacturing line. When the lens curves are transferred to a new carrier from the injection-molding machine the location database 700 updates the location of all the carriers (advancing them all by one location) and adds a data pointer in the location database 700 to the information in the production database 1400 associated with the new carrier.

Preferably the number of records in the production database is equal to or just a few more than the number of carriers in the manufacturing line, and preferably the records in the production database are assigned and reassigned to the carriers in sequence. Alternatively, if desired, the production database can be much larger and form a complete record of each contact lens being supported by each carrier or of all the carriers, which can be stored for a long period of time. The location database preferably also contains a discrete number of records equal to the number of locations (stations) and/or a total number of pallets in the manufacturing line. Every time a new carrier is loaded with front curves, or an empty carrier is advanced, the other carriers are all advanced by a shift register to the next location. Alternatively, the production database can contain the information related to location within the manufacturing line; however, it is preferred to have two separate databases. Additionally, the computer tracks the number of lenses made for each SKU. When a specified number of lens curves or contact lenses are made for one SKU, a change in the SKU will occur by changing one or more molding devices, e.g., mold halves, or the orientation of the molding devices.

After loading the front curves and back curves into the carriers, the front curves are then preferably dosed at stage 1901 with a reactive mixture which is used to make contact lenses following a preferred step of stamping at stage 1900 the front curve mold with a surfactant. Then, at stage 1902 the back curves are placed on the front curves to form lens assemblies. Preferably the front curves remain on the same carrier during deposition of the reactive mixture and back curve placement. (That is why it is preferred that the information in the production database 1400 is associated with the carrier indicator 1310 of the pallet 1309 having the front curves thereupon.) The reaction mixture/contact lenses go through further manufacturing steps. For at least some of the steps, the reaction mixture/contact lenses preferably remain on the same carrier. Preferably, the carrier transports the lens assemblies at least through a cure tunnel 1903, and to a stage 1904 where the back curve is removed. It is preferred that the carrier indicator is machine-readable or interrogatable before many, if not all stages of lens fabrication (e.g., reactive mixture front curve filling stage 1901, UV cure stage 1903, demold stage 1904, inspection stage (not shown), lens rejection stage (not shown), hydration stage 1906, and lidstock heat sealing stage 1908) to ensure that the fabrication process is within prescribed ranges and tolerances, for example, that a lens is not within the cure stage too long. If desired, periodic interrogation can be used to provide the computer for the manufacturing line with information concerning the current position and/or zone of each carrier (storable in the production database 1400, and in the preferred mode comparable with the location database 700) which may carry different SKUs through the manufacturing line 1300. If the fabrication process did not proceed as specified, then the affected lenses are identified for discard in the production database 1400 or by writing to the carrier indicator 1310. The lens curves or lenses will be discarded at the next available reject station (not shown).

Plural SKUs can be fabricated at one time in a manufacturing line using the method of the present invention without the downtime typically associated with preparing the manufacturing line for a different SKU. Further, in the event of a process error, if more than one SKU is present in the same accessible area, and there is a possibility of cross-contamination, then all the carriers carrying the lenses of different SKUs can be marked for discard in the computer 121, preferably in the production database 1400, or by writing to the carrier indicator 1310 and/or tracked (via a zone/position field in the production database 1400 and/or location database 700) until the carrier reaches the next lens reject station not shown). The same is true if the manufacturing process goes awry, or other problems, e.g., a jam in the line, the carriers within an accessible area can be marked for discard or all of the carriers that were being tracked in the manufacturing line can be marked for discard. Alternatively, the manufacturing process can be divided into zones. Zones are areas in the manufacturing lines within which there is a possibility of cross-contamination if there is a problem within that zone, particularly if the problem requires an operator to physically get into the zone to fix the problem. In the preferred mode there are four zones, for example, injection molding of the lens curves, lens fabrication (which in the preferred mode includes all the steps described above after the transfer of the lens curves to carriers through the step of washing and/or hydration of lenses to be described below), packaging (which in the preferred mode includes all the steps described below after the hydration step through putting the arrays of packages in cartons), and injection molding of the packages (the bowls). The lenses and/or other parts (lens curves and bowls) are tracked in the production database 1400 and/or location database 700 or similar databases optimized for the various zones, or the like as they travel from stage to stage in each of the manufacturing zones and from one zone to the next. If a processing problem occurs which involves the chance of cross-contamination in any given zone all the lenses or parts within that zone can be marked for discard. Thus, although plural SKUs are being conveyed through the same manufacturing line 1300 by discarding lenses or lens curves when processing problems occur in the manufacturing line, the risk of cross-contamination where lenses of different SKUs (e.g., different powers) might be inadvertently moved from one carrier to another is decreased.

In accordance with a preferred mode, after back curve removal 1904, and inspection (not shown), the polymerized lenses (cured reaction mixture) are transferred in step 1905 from the carriers 1307 to a second carrier 1377, which will be referred to as trays having their own tray identifier 1376 (second carrier indicator) for was and/or hydration. In the preferred mode, the trays are loaded in a stack and exposed to DI water in a series of steps, preferably, thirty or more steps (e.g., in a vertical hydration column). The trays move up the stack while DI water is dribbled on them to effect hydration. The trays are removed from the top of the stack and the lenses are transferred from the tray to a third carrier 1387 which is preferably an individual carrier for each lens, and will be referred to as a holder. In an alternate embodiment there are no trays and instead the carriers (with their carrier identifiers) pass through the hydration steps without any lens transfer.

The preferred hydration process and apparatus is as described in application Ser. No. 09/252,307 U.S. Pat. No. 6,207,086 issued Mar. 27, 2001 entitled "METHOD AND APPARATUS FOR WASHING OR HYDRATION OF OPHTHALMIC DEVICES" and assigned to the same assignee as the instant invention, the entire disclosure of which is hereby incorporated by reference as if set forth herein.

Each carrier, e.g., pallet 1307 preferably carries eight lenses, preferably in the front curves, but may have fewer if individual lenses were identified during fabrication as flawed and marked for discard or if it is the end of one SKU. The trays 1377 preferably transport sixteen or thirty-two lenses. In the preferred mode, under the supervision of the computer 121 for the manufacturing line 1300, prior to transferring contact lenses, preferably in the front curves from the carriers 1309 to the tray 1377, each carrier indicator 1310 is interrogated by a suitable sensor/reader to ensure that only one SKU is loaded in any given tray 1377, even though the carriers 1309 may not hold sufficient lenses of one SKU to fill a tray.

The load status of each tray 1377 may be stored in the computer 121, preferably in the production database 1400 previously described or in a separate production database for the hydration stage. As with the carriers, each tray 1377 preferably has an interrogatable tray identifier 1376 such as a bar code RF chip or the like, more preferably an RF chip such as the ICC-12T1 made by Pepperl+Fuchs, Inc. For the lens curves loaded onto a tray 1377, the computer 121 assigns the information assigned to the one or more carrier indicators 1310 from which the lens curves were removed to the (machine accessible memory of the) tray identifier 1376, or the tray identifier 1376 is added to the information stored for the carrier indicators 1310 in the production database 1400 in the machine accessible memory of the computer 121. Preferably there is a separate production database (not shown) for the hydration stage and some of the information is copied or moved from the production database for the carriers and stored in the production database for the hydration stage and stored with the tray identifier. The SKU of the contact lenses carried by each tray is known from this information. The tray identifier and location database provides for tray tracking of the tray location by the computer. Preferably, there is a separate location database (not shown) for the trays in the hydration stage with a data pointer to the tray identifier in the production database. The tray identifier enables each tray to be tracked as it moves through each step of the hydration stage toward the lens transfer station 1905, and enables a cross-contamination condition to be identified when a process shut-down occurs which affects the hydration stage 1906 when more than one SKU of lenses is being transported therein. After, a tray 1377 has been filled, or when a change in SKU has been detected as in the previous example, the tray is moved into the bottom of the stack to proceed with the hydration. Subsequent trays are similarly loaded with lenses and moved into the stack, as described above and in the aforementioned patent application entitled "METHOD AND APPARATUS FOR WASHING OR HYDRATION OF OPHTHALMIC DEVICES." For every tray which is loaded and moved into the stack the trays in the location database are all advanced by one location. The location database for the hydration stage is similar to the location database described for the carriers.

After hydration, step 1906 the lenses are preferably loaded into individual holders 1387 which may be parts of the final package, for example, using the method and apparatus described in U.S. Ser. No. 09/252,287 entitled "CONTACT LENS TRANSFER AND MATERIAL REMOVAL SYSTEM" (VTN-418), and assigned to the same assignee of the instant invention, the entire disclosure of which is hereby incorporated by reference as if set forth herein. Preferably, a discrete number, e.g., about fifty, of holders 1387 each carries one lens are sequentially indexed in the packaging zone 1908 which includes the lidstock application and heat seal stages. Preferably, each of the holders 1387 is lined with a bowl or cavity portion of a primary package which receives the lenses, as described in U.S. Ser. No. 09/217,878 entitled "HEAT SEAL APPARATUS FOR LENS PACKAGES and assigned to the same assignee as the instant invention (VTN-415), the entire disclosure which is hereby incorporated by reference as if set forth herein. See also, commonly assigned U.S. Pat. No. 5,687,541 of Martin et al., the entirety of which is hereby incorporated by reference as if set forth herein. The holders 1387 are advanced toward a lidstock applicator and heat seal system 1910, as disclosed in the foregoing patent application, and each primary package is inspected to verify the presence of a contact lens prior to heat sealing, as described in U.S. Pat. No. 6,246,062 issued Jun. 12, 2001 entitled "MISSING LENS DETECTION SYSTEM AND METHOD" (VTN-423) and assigned to the same assignee as the instant invention, the entire disclosure of which is hereby incorporated by reference as if set forth herein. Using a reject mechanism controller (not shown), preferably of the type disclosed in U.S. Pat. No. 5,568,715, the disclosure of which is hereby incorporated by reference, holders which are missing lenses or containing lenses which have been earlier marked for discard in the production database are routed to a rejection gate whereas holders that pass detection are advanced along the conveyor to the next station, namely the heat seal station. The removal of a holder from the manufacturing line is noted in the production database 1400 and the location database 700 in the computer 121. Preferably there are individual production and location databases for the packaging stage.

In accordance with the preferred embodiment of the invention, the computer obtains the SKU of the contact lens being transferred from the tray 1377 to the holder 1387, by reading or interrogating the tray identifier 1376 via machine reader 1350 as shown in FIG. 5. This information can be used to synchronize the information to be printed on the lidstock with the contents of the package, and/or to check against the location database 700. The individual holders 1387 may each have the own identifying means wherein the SKU data is stored or the SKU data is associated with each individual holder's identifying means throughout the packaging stages shown collectively as 1908 in FIG. 5 in the production database 1400 and/or location database 700. The preferred contact lens packaging stages include a lens load stage in which a lens is loaded into a package on a holder, an inspection or detection stage in which flawed lenses or missing lenses (and their individual holders) are removed from the packaging stages, a saline fill stage in which the package is filled with saline, a heat seal stage in which one or more packages are sealed together, and a carton loading stage which completes the packaging. In single SKU systems of the prior art, synchronization of printing matter on the lidstock was not an issue because the same information was applied to all packages. However, in the present system 1300, the association of the SKU with each individual holder 1387 ensures that each lens is labeled heat-sealed in a proper array and packaged appropriately. Synchronization is preferably under the direction of the computer 121.

In the preferred embodiment, the individual holders do not have their own identification means and are preferably tracked by using a location database for the individual holders, e.g., a shift register for the holders in the packaging zone. The shift register preferably has a data pointer to a production database for the packaging stage which stores the information it copied or moved from the production database for the hydration stage associated with the tray identifier from which the lens was loaded into the holder. The shift register advances the finite number of holders in the packaging stage every time a new holder is loaded with a contact lens or advanced empty. The information from the database for the individual holders is used to determine when an array of a predetermined number of lenses of the same SKU has been combined for the lidstock application and heat seal stage. When the predetermined number (e.g. six to form two arrays of three each) of lenses (holders) of the same SKU have been combined to form the array, the SKU information from the production database is provided to a lidstock printer which prints the optical characteristics of the lenses of that SKU, as well as other data such as the lot number, and expiration date, etc., as described in U.S. Pat. Nos. 5,565,059 and 5,674,347, both assigned to the present assignee and incorporated by reference as if set forth in their entireties herein. The lidstock for the array is then maneuvered and applied to the primary packages as described in the aforementioned "HEAT SEAL APPARATUS FOR INDIVIDUAL LENS PACKAGES" patent application. Likewise, the computer provides SKU information to a carton label printer to ensure that appropriate information is printed on the carton containing the packaged lenses. On the other hand, if there is an insufficient number of lenses of one SKU to complete an array (e.g., six lenses) or to fill a carton (e.g., two arrays) any partial array is flagged for rejection in the databases and will be rejected by the reject mechanism controller. Any lidstock or cartons which were printed in advance of determining the actual yield of the SKU are discarded so that they do not cross-contaminate the next SKU.

The system and method of the present invention preferably keeps track of the overall yield (percentage of good lenses of a given SKU). By accessing such historical-yield data, the system can automatically calculate an estimated SKU size that needs to be made in order to fabricate a desired amount of product. For example, if 100 lenses having a particular optical characteristic are desired but the machine has only a 90% yield for that SKU, then 111 or 112 lenses will be manufactured. Different SKUs may have different yields, and so the historical-yield data can be used to ensure that an appropriate SKU size is produced by the manufacturing line. This information can be updated by calculating current-yield data for a manufacturing line. Further or alternatively, this information can be used in the scheduling system described below to determine the number of a SKU to be produced in a manufacturing line.

To minimize the risk of cross-contamination, in each of the enumerated situations below, it is preferred that all of the concerned carriers will be marked for rejection when either a normally-closed guard-door is opened, the process is stopped within a zone, or for any reason including an emergency:

1. If more than one SKU is present in the same accessible area, then all of the carriers, e.g., pallet trays and holders in the area will be marked for reject;
2. If the cure tunnel door is opened and more than one SKU is in the tunnel, then all of the carriers in the tunnel will be marked for reject;
3. If more than one SKU is present between the cure tunnel exit and the back curve removal, all of the carriers between these two stages will be marked for reject;
4. If more than one SKU is present between lens loading to the packages and heat sealing primary packages, then all of the carriers, e.g., holders in this area will be marked for reject; and
5. If more than one SKU is present between heat seal array transfer and carton loading, then all of the arrays in this area will be marked for reject.

This invention further provides an automated method of tracking molding devices comprising putting an identification means on molding devices, and providing a database, referred to as a tracking database, comprising fields for the status of said molding devices. The tracking database 800 is shown in FIG. 8. The molding devices are inserts, cassettes, mold halves, and/or molds. Preferably the tracking database comprises fields for inserts 24,25. The inserts may comprise identification means (not shown) which are preferably machine-readable and store information about the insert including its unique identification number. Alternatively, the insert identification means may be a bar-code or identification number which may or may not be machine-readable. The fields in the tracking database for the status of the inserts may include, for example, an insert identification number 801, whether the insert has been ordered for manufacture 802, manufactured, qualified for production 803, which cassette the insert in assigned to 804, characteristics of the molded parts made by the inserts, e.g., power 805, cylinder 806, and/or axis 807 of contact lenses, how many times the insert has been used for molding 808, and whether the insert is in need of repair 809. Preferably the tracking database further comprises fields for the status of the cassettes (not shown). The cassettes preferably comprise identification means, e.g., RF chips, which are machine-readable and are capable of storing information about the parts which are molded by the cassette, and a unique identification number. Alternatively, the identification means may be a bar-code or identification number, which may or may not be machine-readable. The fields (not shown) in the tracking database for the status of cassettes may include, for example, whether the cassettes have been assembled with inserts and which inserts, characteristics of the molded parts made by the cassettes, how many times the cassette have been used for molding, repair status of the cassette, retirement of cassette, and location of the cassette, for example, in a mold half, in a manufacturing line, or in a cassette storage room. Alternatively, or in addition to the insert and/or cassette databases, mold halves may also have a similar status database (not shown); however, presently it is preferred that the mold halves are not tracted, and that there are two mold halves for every injection molding machine and that the two mold halves stay mounted on the injection molding machine unless they are removed for repair or replacement.

Figure 9:
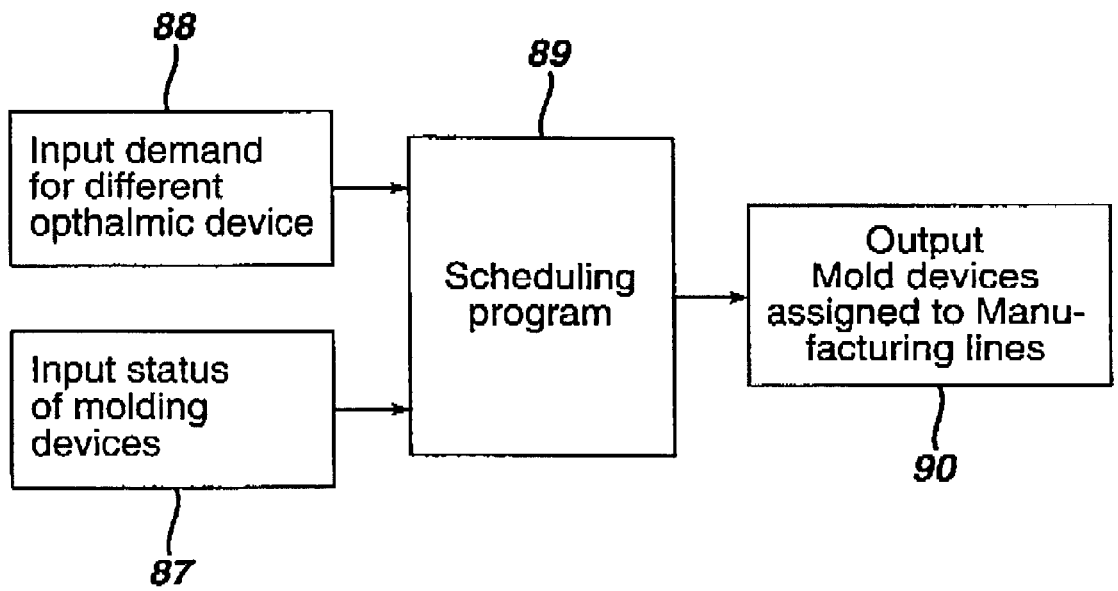
FIG. 9 is a diagramical view of a method of this invention.

Preferably the cassettes which are used in and interchangeable in the mold halves in the molding machines in multiple manufacturing lines, and the inserts used in the cassettes are tracked by the tracking database. Preferably there are a limited number of cassettes, e.g., fifty for use in several manufacturing lines, e.g., ten, to be used in various combinations to make tens of thousands of SKUs. The database for tracking molding devices is preferably used to input information into a scheduling program 89 shown in FIG. 9 on the availability of cassettes to determine what SKUs to produce in at least one manufacturing line 1300. Preferably the scheduling program schedules production for multiple manufacturing lines (not shown). The scheduling program 89 will preferably schedule production of the SKUs based on historical demand for products or according to outstanding orders received from customers or by a combination of historical demand and outstanding orders 88. This information will be communicated to the scheduling program 89 either by inputting this information into the program or by having a database which can be accessed by the scheduling program or both. Customer orders can be accumulated and communicated to the scheduling program as disclosed in U.S. Pat. No. 4,958,280, incorporated herein by reference. Further the scheduling program preferably can access or otherwise communicate with the tracking database 800 described above which tracks the molding devices. The tracking database will provide information to the scheduling program 89 on the status of the molding devices 87, particularly information on which molding devices are available for using in the manufacturing lines. Additional information (not shown) preferably communicated to the scheduling program or stored in fields provided in the scheduling program includes what ophthalmic devices have been, and are presently being made, and in which manufacturing line(s), and if any manufacturing lines are being repaired. Based on all the information described above which is provided to the scheduling program, the scheduling program determines which SKU will be made by the manufacturing line or lines 90. The program optimizes the production by the manufacturing lines, that is, it provides for the least amount of downtime and mold changes. If a molding device is not available, different molding devices will be used to make different SKUs until the scheduling program is advised that a needed molding device is available. Presently, as shown in FIG. 5 for manufacturing line 1300 the scheduling program 89 provides information to the computer 121 for each manufacturing line regarding the next SKU to be produced by each manufacturing line. The scheduling program 89 will preferably communicate to the manufacturing line the cassettes 21A,22B to be used, and more preferably additional information including, the number of ophthalmic devices of that SKU to be produced, and the lot number and expiration date for that SKU. At present an operator receives the information about the cassettes needed for the next SKU and makes sure the proper cassettes in the mold half are placed in the area for the next mold half. (Alternatively, the whole system could be automated.) In the preferred mode, when the mold half 20A is placed in the staging area 50 for the next mold half on the injection molding machine 500, preferably a vertical injection molding machine, the identification means on the cassettes (mold half) are read by the computer 121 via machine reader 1301 for the manufacturing line 1300. If one or both of the cassettes 21A,22A are not the proper cassettes, the operator will be notified. If the proper cassettes are present in the next staging area for the mold half then when molding of the prior SKU is finished, the injection molding machine will remove the mod half (first mold half) which was being used and load the next mold half 20A (second mold half) preferably as the bottom mold half, and begin production of the molded parts of the next (second) SKU. Before the next mold change, the actual number of product, e.g., contact lenses produced can be communicated to the scheduling program 89. In addition, the number of molding cycles is preferably tracted and added to the number stored in the identification means for the cassettes 117,118 and/or in the records for both the inserts and the cassettes in the tracking database 800.

While the invention has been particularl described with respect preferred embodiments thereof, it will be understood by those skilled in the art that other changes in form and details may be made therein without departing from the spirit and scope of the invention, which should be limited only by the scope of the appended claims.

We claim:

1. A method for tracking multiple SKUs of ophthalmic devices in a manufacturing line, comprising the steps of:

assembling first molding devices, at least one of said first molding devices having an identification means;

reading said identification means of said at least one of said first molding devices;

forming first molded parts using said first molding devices;

providing a plurality of carriers, said carriers having carrier indicators;

transferring said first molded parts to at least one of said plurality of carriers;

reading said carrier indicator of said at least one of said plurality of carriers carrying said first molded parts; and storing in machine-accessible memory the information associated with said identification means of said at least one of said first molding devices and the information associated with said carrier indicator carrying said first molded parts.

2. The method of claim 1, wherein said first molded parts are contact lenses.

3. The method of claim 1, wherein said first molded parts are lens curves.

4. The method of claim 1, wherein said reading steps are done using machine-readers.

5. The method of claim 1, wherein said reading step of said identification means of said at least one of said first molding devices is done by an operator.

6. The method of claim 1, wherein after said reading step of said identification means of said at least one of said first molding devices and prior to said forming step, the method further comprises the step of checking a computer for the manufacturing line to be sure the proper molding device is being used.

7. The method of claim 1, wherein said at least one of said first molding devices having an identification means is a cassette, wherein said cassette is part of a mold half.

8. The method of claim 7, wherein said at least one said first molding devices having an identification means is two cassettes, each cassette having its own identification means, at least one cassette making front curves, and one cassette making back curves.

9. The method of claim 8, wherein said mold half is used in an injection molding machine in the manufacturing line.

10. The method of claim 1, wherein said identification means is selected from the group consisting of a bar code and a radio frequency chip.

11. The method of claim 1, wherein said carrier indicator is a radio frequency chip.

12. The method of claim 2, further comprising the step of packaging said contact lenses.

13. The method of claim 12, wherein said information comprises a power of a contact lens, and wherein after said storing step, said method further comprises the step of communicating said power in said machine-accessible memory to a printer and printing said power on packaging materials for said contact lens.

14. The method of claim 13, further comprising prior to said communicating step, the steps of transferring said first molded parts from said at least one carrier comprising a carrier indicator to at least one tray comprising a tray identifier, reading said tray identifier, and storing in machine-accessible memory said tray identifier with the information associated with said carrier indicator from which said first molded parts were removed.

15. The method of claim 14, wherein said tray and said carrier only carry ophthalmic devices of the same SKU.

16. The method of claim 14, wherein said tray is a hydration tray.

17. The method of claim 14, further comprising the steps of:
transferring said first molded parts from at least one tray comprising a tray identifier to at least one package carried by at least one holder; and
tracking said at least one holder by a shift register, said shift register comprising a pointer to said information associated with said tray identifier from which said first molded parts were removed.

18. The method of claim 17, further comprising the steps of:
providing information from said shift register to a printer to produce packaging materials for said at least one package.

19. The method of claim 1, wherein said method further comprises:
providing a database comprising fields corresponding to various locations in the manufacturing line, and fields for identifying which of said plurality of carriers is in said location;
automatically advancing said carriers in said fields corresponding to various locations when a new carrier is introduced into the manufacturing line.

20. The method of claim 1, wherein said first molded parts are front curves and back curves, and wherein said carrier indicator which is read in the step of reading said carrier indicator is the carrier indicator of at least one of said plurality of carriers carrying said front curves, and said method further comprises the steps of:
dosing reaction mixture into said front curves;
placing said back curves on said front curves to form lens curve assemblies;
curing said reaction mixture to form a cured reaction mixture;
removing said back curves from said front curves;
transferring said cured reaction mixture from said carriers to at least one tray comprising a tray identifier;
reading said tray identifier; and
storing in machine-accessible memory said tray identifier associated with said carrier indicator from which said cured reaction mixture is removed.

21. The method as in claim 1, wherein said step of reading said identification means is performed when the at least one molding device is changed.

22. The method of claim 1, including the additional steps of:
inputting into a computer a desired number of ophthalmic devices for a predetermined SKU;
accessing historical-yield data from the memory of the computer concerning said predetermined SKU;
calculating an estimated production run size by multiplying said desired number of ophthalmic devices by said historical-yield data; wherein said forming, providing, transferring, reading, and storing steps are repeated until said estimated production run size is met.

23. The method of claim 22, including the further steps of:
packaging said ophthalmic devices;
computing a current-yield data as a percentage of packaged ophthalmic devices compared to the number of first molded parts transferred in said transferring step; and
revising said estimated production run size using said current-yield data as the historical-yield data.

24. The method of claim 1, wherein while at least one of said first molded parts is still in said manufacturing line said method further comprises the step of:
assembling second molding devices at least one of said second molding devices having an identification means;
reading said identification means of said at least one of said second molding devices;
forming second molded parts using said second molding devices, said second molded parts are part of a different SKU than said first molded parts;
providing a plurality of carriers, said carriers having carrier indicators;
transferring said second molded parts to at least one of said plurality of carriers;
reading said carrier indicator of at least one of said plurality of carriers carrying said second molded parts; and
storing in machine-accessible memory the information associated with said identification means of said at least one of said second molding devices and the information associated with said carrier indicator carrying said second molded parts.

25. The method as in claim 24, wherein said manufacturing line comprises two or more zones and if there is a problem within one of said zones and said first and second molded parts are present within said zone having said problem then all of said first and second molded parts in said zone having said problem will be discarded.

26. The method as in claim 25, wherein said zones comprise injection molding, lens fabrication, and packaging.

27. The method of claim 1, wherein stored in said identification means is the power of said molded parts made using said first molding devices.

28. The method of claim 1, wherein stored in said identification means a re process conditions for said molded parts made using said first molding devices.

29. A system for tracking multiple SKUs of ophthalmic devices in a manufacturing line, the system comprising:
machine-accessible memory;
first molding devices at least one of said first molding devices comprising an identification means; wherein said first molding devices make first molded parts;
means for reading said identification means of said at least one of side first molding devices;

a plurality of carriers, said carriers having carrier indicators;

means for transferring said first molded parts to at least one of said plurality of carriers;

means for reading said carrier indicator of said at least one of said plurality of carriers carrying said first molded parts; and means for storing in said machine-accessible memory the information associated with said identification means of said at least one of said first molding devices and the information associated with said carrier indicator carrying said first molded parts.

30. A method of tracking a plurality of molding devices for ophthalmic devices comprising:

providing an identification means on molding devices; and providing a database comprising fields for the status of said molding devices.

31. The method of claim 30, wherein said identification means is a radio frequency chip or bar code.

32. The method of claim 30, wherein said fields comprise the location of each of said molding devices.

33. The method of claim 30, wherein said molding devices comprise cassettes.

34. The method of claim 30, wherein said molding devices comprise inserts.

35. The method of claim 30, wherein said molding devices comprise mold halves.

36. The method of claim 33 wherein said cassettes are used in injection molding machines.

37. A method of scheduling the production of multiple SKUs of ophthalmic devices using a plurality of molding devices for use in at least one manufacturing line which is capable of making multiple SKUs comprising:

a). communicating to a scheduling program demand for different ophthalmic devices;

b). communicating to said scheduling program the status of molding devices;

c). scheduling by said scheduling program based on the information communicated to said scheduling program in steps a and b which of said molding devices are to be used in said at least one manufacturing line.

38. The method of claim 37, wherein said method is used to schedule the production of ophthalmic devices in a plurality of manufacturing lines which share said molding devices.

39. The method of claim 38, wherein said molding devices comprise cassettes.

40. The method of claim 38, wherein the number of said molding devices are limited so that not all of said plurality of manufacturing lines which share said molding devices can make all of the same SKUs at the same time.

41. The method of claim 37, further comprising the step of:

d). communicating by said scheduling program to said at least one manufacturing line first molding devices to be used in said manufacturing line and the quantity of ophthalmic devices to be made by said manufacturing line using said first molding devices.

42. The method of claim 41, further comprising the steps of:

e). assembling said first molding devices according step d, at least one of said first molding devices having an identification means;

f). reading said identification means of said at least one of said first molding devices;

g). forming first molded parts using said first molding devices;

h). providing a plurality of carriers, each carrier having a unique carrier indicator;

i). transferring said first molded parts to at least one of said plurality of carriers;

j). reading said carrier indicator of at least one of said plurality of carriers; and k). storing in machine-accessible memory the information associated with said identification means of said at least one of said first molding devices and the information associated with said carrier indicator.

43. The method of claim 42, further comprising the step of:

l). repeating steps a through k for second molding devices.

* * * * *

UNITED STATES PATENT AND TRADEMARK OFFICE
CERTIFICATE OF CORRECTION

PATENT NO. : 6,609,041 B1　　　　　　　　　　　　　　　　　　　　　　Page 1 of 1
DATED : August 19, 2003
INVENTOR(S) : Ravi S. Sanka et al.

It is certified that error appears in the above-identified patent and that said Letters Patent is hereby corrected as shown below:

<u>Column 20,</u>
Line 68, please replace "side" with -- said --

Signed and Sealed this

Fourth Day of November, 2003

JAMES E. ROGAN
*Director of the United States Patent and Trademark Office*